United States Patent
Neginsky

(10) Patent No.: US 7,844,825 B1
(45) Date of Patent: Nov. 30, 2010

(54) METHOD OF GENERATING A SPATIAL AND CHROMATIC PASSWORD

(76) Inventor: Alex Neginsky, 9466 Lago Dr., Boynton Beach, FL (US) 33437

( * ) Notice: Subject to any disclaimer, the term of this patent is extended or adjusted under 35 U.S.C. 154(b) by 1237 days.

(21) Appl. No.: 11/256,551

(22) Filed: Oct. 21, 2005

(51) Int. Cl.
*G06F 21/00* (2006.01)

(52) U.S. Cl. ...................................... 713/184

(58) Field of Classification Search .................. None
See application file for complete search history.

(56) References Cited

U.S. PATENT DOCUMENTS

| | | | |
|---|---|---|---|
| 5,465,084 A * | 11/1995 | Cottrell | ...................... 340/5.27 |
| 5,465,085 A | 11/1995 | Caldwell | |
| 5,559,961 A | 9/1996 | Blonder | |
| 5,928,364 A * | 7/1999 | Yamamoto | ................... 726/18 |
| 6,720,860 B1 | 4/2004 | Narayanaswami | |
| 2004/0034801 A1 | 2/2004 | Jaeger | |

FOREIGN PATENT DOCUMENTS

| | | |
|---|---|---|
| JP | 2000003335 A | 7/2000 |
| JP | 2003132290 A | 9/2003 |

* cited by examiner

*Primary Examiner*—Brandon S Hoffman
(74) *Attorney, Agent, or Firm*—Melvin K. Silverman; Yi Li

(57) ABSTRACT

A method of generating a non-linear spatial and chromatic password includes the steps of establishing a spatial password entry pattern (SPEP) within boundary conditions of a matrix of a password entry screen (PES), the SPEP including coordinates of the matrix of the PPS. The method also includes selecting a first color from a color selection keypad (CSK) having many selectable colors. The first color is then mapped to a first coordinate of the SPEP of the matrix. Then, a second color from said CSK is mapped to a second coordinate of said SPEP. The above steps of selection and mapping are then repeated for N coordinates, each corresponding to a selected color of the CSK, until all coordinates falling within the boundary conditions defining said non-linear SPEP are fully mapped. A high security, high anti-decryption, spatial and chromic password results.

17 Claims, 5 Drawing Sheets

METHOD OF GENERATING A SPATIAL AND CHROMATIC PASSWORD

BACKGROUND OF THE INVENTION

A. Area of Invention

This invention relates to a method of producing high security, personalized computer access passwords.

B. Description of Related Art

A password is generally recognized as either a confidential word, phrase, or sequence of alpha-numerics that one must use to gain access to a software location, or a sequence of characters that one must input to a computer keyboard to access a part of a larger system. Passwords generally comprise a combination of numerical, alphabetic or symbolic characters, and are typically chosen by users to form some sequence that is easily remembered by the user. As such, users are often inclined to use character sequences that are already known to them, such as a social security number, telephone number, license plate number, birthday, or password to another system. Such users are also likely to save their passwords in some file within the computer system to thus avoid the possibility of a lockout through forgetting of the password. Both of these characteristics of passwords and their users are exploitable by a determined, sophisticated spy, or agent of a foreign government or hostile political group. Even given sufficient resources, such an agent can input a vast number of characters pertinent to a user's circumstances, or search every file within the computer until the password file is located. In other words, a determined code breaker, equipped with state-of-the-art hardware and software, can penetrate a password consisting of numeric, alphabetic, and/or symbolic characters if the set of each such character are known in advance and the password consists of a finite, repetitive sequence, i.e., a non-changing password.

Common shortcomings to the passwords described above, as well as other drawbacks, exemplify ways in which the theoretical odds of securing or breaking a password are reduced from the usual exceedingly high number to one much lower, to gain unauthorized access to a computer, computer file, communication channel, ATM, or the like. As such, password protection of a computer access means may not provide the security required or desired by the user or owner, particularly where the prospective unauthorized user has unlimited time and access to contemporary decryption software and a mainframe.

A further shortcoming of the prior art is that a system user may, without knowledge, be observed by a spy or adversary and, through observation or recordation the steps of input by the user, the password may be remotely communicated to a criminal or adversary. As such, any effort to defeat such state-of-the-art computer espionage must proceed along at least two axes, namely, a password component which does not include repetitive alpha-numerics or fixed group of symbols and, secondly, an input system in which the password cannot be derived by mere observation of the access inputs of an authorized user.

In one approach of the prior art to this problem, Yamamoto (U.S. Pat. No. 5,928,364) uses one color, selected from a set of red, blue and green, as one variable within a larger graphic password creation system. This is a single-factor authentication tool involving selecting, from a table, a series of colored graphics having selectable colors to serve as a password. The invention involves selecting from a table of "hieroglyphics/characters" a linear sequence of graphics and a selected basic color for each graphic to serve as password registration keys.

Jaeger (US Pub. No. 2004/0034801) creates and uses computer passwords derived from colors and graphic objects. This specific design and graphic features are assigned specific numeric designators by which patented designs and graphic trademarks may then be databased and searched. In Jaeger, the password is formed by selecting one or more of a plurality of objects, one or more colors of this plurality of objects, and a spatial arrangement of the plurality of objects. Jaeger is more complex and costly to implement than this the system.

Caldwell (U.S. Pat. No. 5,465,085) discloses using a grid (rows and columns) in arranging symbols and/or colors as keys to a password. The symbols and/or colors may be entered using a mouse. Details about how a user selects specific colors are not disclosed.

Cottrell (U.S. Pat. No. 5,065,084) lists colors as one variable, co-equal with the use of alphas, numeric, and symbols which may be employed, to create a square matrix-like password screen similar to that of a scrabble board. This approach does not have the encryption power or signature creation sophistication of the present invention.

U.S. Pat. No. 6,720,860 to Narayanaswami, held by IBM, entails a temporally based sequence display of one or more flashing images, spatially arranged on the password screen. One must select the correct icons in the correct sequence to access the protected device.

Another example of a graphical password system appears in U.S. Pat. No. 5,559,961 to Blonder, held by Lucent Technologies, in which the In this patent, the password is derived from so-called "tap regions" in a single display, i.e., to input the password, one must touch or tap predetermined parts of the screen in a predetermined sequence.

Japan Patent Application Publication No. 2003132290 discloses what appears to be a two-factor authentication method involving using a traditional password as one factor and a table of displayed "notations, figures or symbols including a combination of these or a combination of these and colors" as a second factor. The user first enters his or her password. Next, the table or notations, figures, symbols, and colors are displayed to the user for the user to select using a mouse. If all the correct notations, figures, symbols, and colors are selected, the user's authentication is checked against a stored registry.

Japan Patent Application No. 2000003335 discloses a single-factor authentication technique involving selecting a single color from a color wheel as a key for a password. Although it is not clear from the Japanese language text, the invention appears to rely on a traditional input device, such as a mouse, to select the color. The selected color is then compared to a color in the password registry to authenticate the user.

It is in response to the above long felt needs in the art for an improved such password system that the present invention is directed.

SUMMARY OF THE INVENTION

The present inventive method relates to a novel method of generating a spatial and chromatic password. This method comprises the steps of (a) establishing a non-linear spatial password entry pattern (SPEP) within boundary conditions of a matrix of a password entry screen (PES), said SPEP including a plurality of coordinates of said matrix; (b) selecting a first color, a color selection keypad (CSK) having a multiplicity of selectable colors therein; (a) mapping said selected color to a first coordinate of said SPEP of said matrix; (d) selecting a second color from said CSK; (e) mapping said selected color to a second coordinate of said SPEP of said matrix; (f) repeating such selecting and mapping, for a respective N number of coordinates, each corresponding to a color of said CSK, until an entirety of coordinates defining said non-linear SPEP are filled with colors mapped from said CSK. Said selecting steps of each color from said CKS may include selecting a color consisting of a ratio or primary colors of red, green and blue.

It is, as such, an object of the present invention to provide a method of generating a high encryption power password for a computer system access.

It is another object to provide a method of the above type in which said password includes a spatially and chromatically defined password.

It is a further object of the invention to provide a method of generating a spatial and chromatic password having particular utility in high security environments.

It is a yet further object to provide a method of the above type in which observation of an authorized user's input by an unauthorized user will have little value for purposes of decryption or password espionage.

It is a further object to provide a system in accordance with the above method.

The above and yet other objects and advantages of the present invention will become apparent from the hereinafter set forth Brief Description of the Drawings, Detailed Description of the Invention and Claims appended herewith.

DETAILED DESCRIPTION OF THE INVENTION

Figure 1:
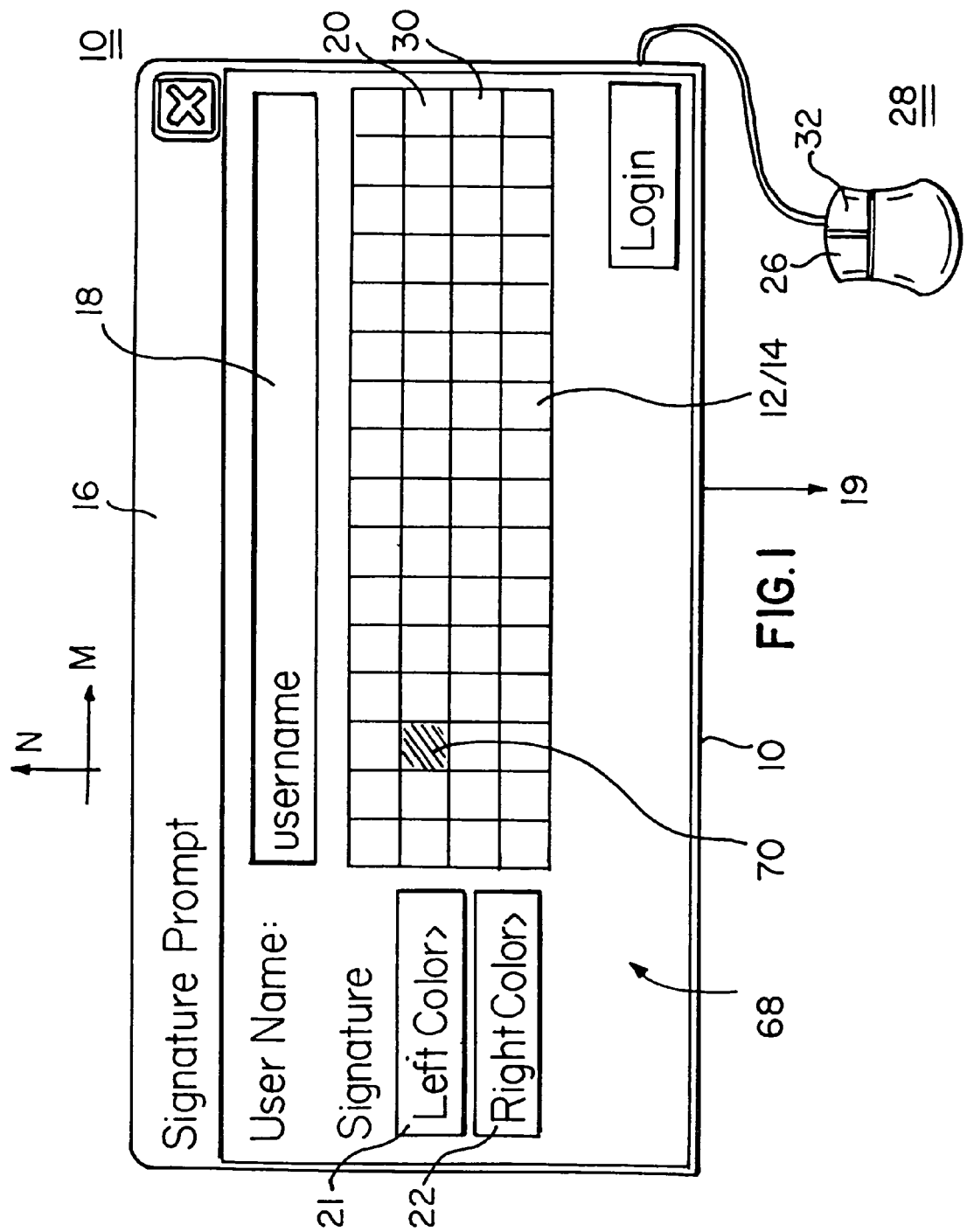
FIG. 1 is a schematic view of a password entry screen in accordance with the present invention.

The invention generally relates to a method of generating a spatial and chromatic password, using a color signature selection grid or keypad (CSK) with which a spatially and chromatically defined password is created. More particularly, with reference to FIG. 1, therein is shown password entry screen (PES) 10 which, in a preferred embodiment, will comprise a matrix 12 having N×M boundary conditions defined within a plurality of coordinates 14 within said matrix 12. In FIG. 1, N=2 and M=16. The PES 10 is defined. PES 10 also includes a signature prompt portion 16 which, firstly, will request that a user name be inputted within linear portion 18 of the PES 10. In the embodiment of FIG. 1, this would be accomplished using a keyboard 19. Thereafter, the user is prompted to enter a color defined password that, comprises a horizontal row or M-length sequence of so-called left colors 21, this meaning that selectable colors (more fully described below) are inputted to particular N×M coordinates 14 of row 20 by left click 26 of a mouse 28. Conversely, inputs to coordinates 14 of right color row 30 are effected by clicking right side 32 of mouse 28.

Figure 2:
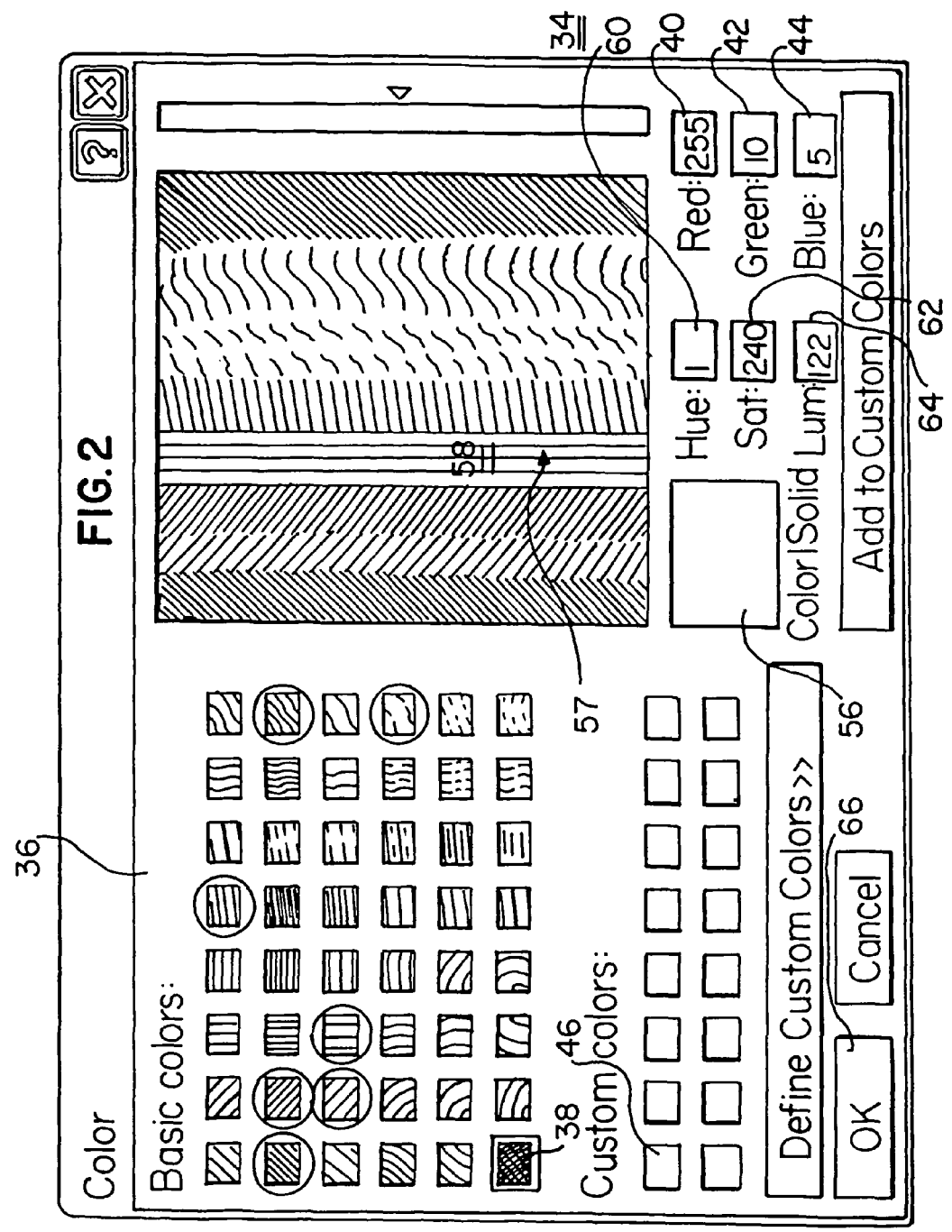
FIG. 2 is a schematic view of a color selection keypad in accordance with a first embodiment of the invention.

Such left and right clicks are the selection inputs of successive entries upon the PES which derives from a color selection keypad (CSK) 34 (see FIG. 2). Shown therein is a multiplicity of so-called standard or basic colors 36 which are provided by the CSK 34. Said basic colors are pre-defined by a ratio of primary colors of red, green and blue. However, should one wish, for purpose of enhanced security, one may create one or more custom colors. To do so, location 38 is clicked upon and, therefrom, a user may select a desired ratio of the primary colors using a red dropdown menu 40, a green dropdown menu 42, and a blue dropdown menu 44. By selecting one of 255 available intensities of each of said three primary colors, one may create (255*3) possible combinations for each custom color 38. This color may, in turn, be stored at location 46 of the CSK 34 after approved button 66 is clicked on, using cursor 57. This process of creation of customized colors may be repeated many times such that a group of many customized colors may be formed, and the settings associated therewith stored at locations 46, 48, 50, 52, 54, and so forth. A given customized color may be displayed during its creation process (prior to approval) window 56 of the CSK or, alternatively, customized colors may be formed by selectable clicking with said cursor 57 upon a color spectrum sub-screen 58 of the CSK 34.

If desired, further yet more sophisticated levels of encryption in the formation of customized colors may be accomplished through the selection of a particular hue 60, saturation 62 and/or luminosity 64. These may be selected through the use of dropdown means for each of said hue, saturation and luminosity parameters of the CKS. In the use of such variables, one may readily produce color parameters for storage at locations 46-54, this representing just a few customized colors among potentially millions. (All possible color combinations are 255' for each). When a desired basic color 36 or a customized color 38 is selected, said approval button 66 is clicked upon. Thereafter, through the use of a cursor 68 on the PES 10, a selected basic color 36, customized color 38, or a stored customized color 48-56 may be left or right mouse clicked to a desired coordinate 70 in the N×M set of matrix 12. Left click row 20 or right click row 30, may be afforded enhanced security by encoding certain of said colors 36, 38 or 46-54 as so-called "left click" or "right click" colors only or, alternatively, security software associated with the password screen 10 may be programmed to accept only certain colors along left color row 20 and other colors along the coordinates of right color row 30. The matrix 12 must recognize the color itself which has been mapped onto it. To accomplish this, coordinates 70 of the matrix are provided with appropriate electro optical sensors. Each selected color, whether basic or custom, may include a digital side band which precisely identifies each color, including hue, saturation, and luminosity, for every possible combination which could be created.

With reference to the above, it is to be appreciated that, in other embodiments of the present invention, it will not be necessary to use both the left and right color rows or to use all 16 of M coordinate positions within rows 20 or 30. Also, in a yet further embodiment, in which the distinction between left and right color may or may not be retained, a subset or boundary condition within matrix 12 may be employed which limits the coordinates 70 of the matrix that may be entered.

Figure 3:
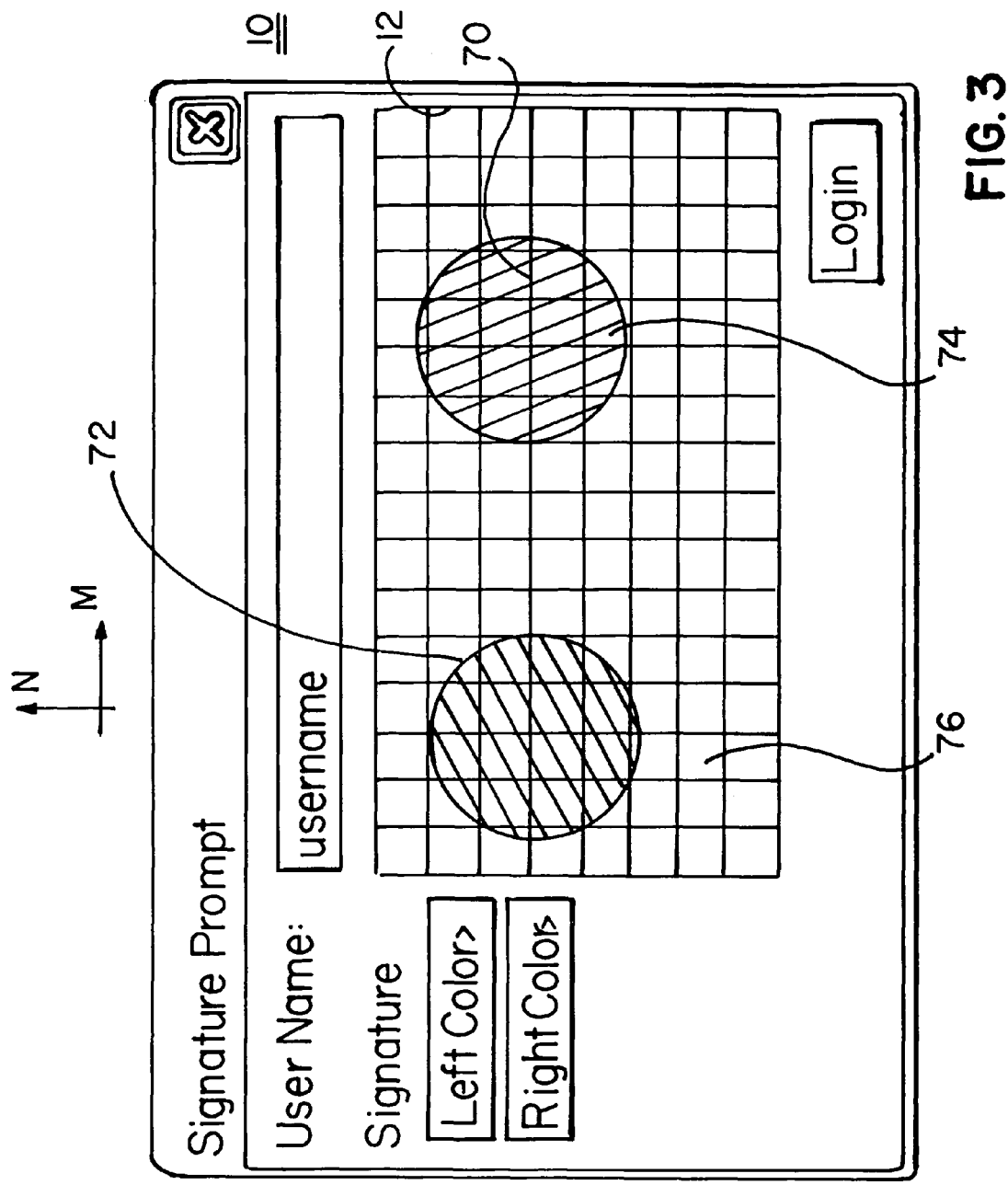
FIG. 3 is a view, similar to that of FIG. 1, however showing the use of boundary conditions to define the input usable geometry of the password entry screen.
Figure 4:
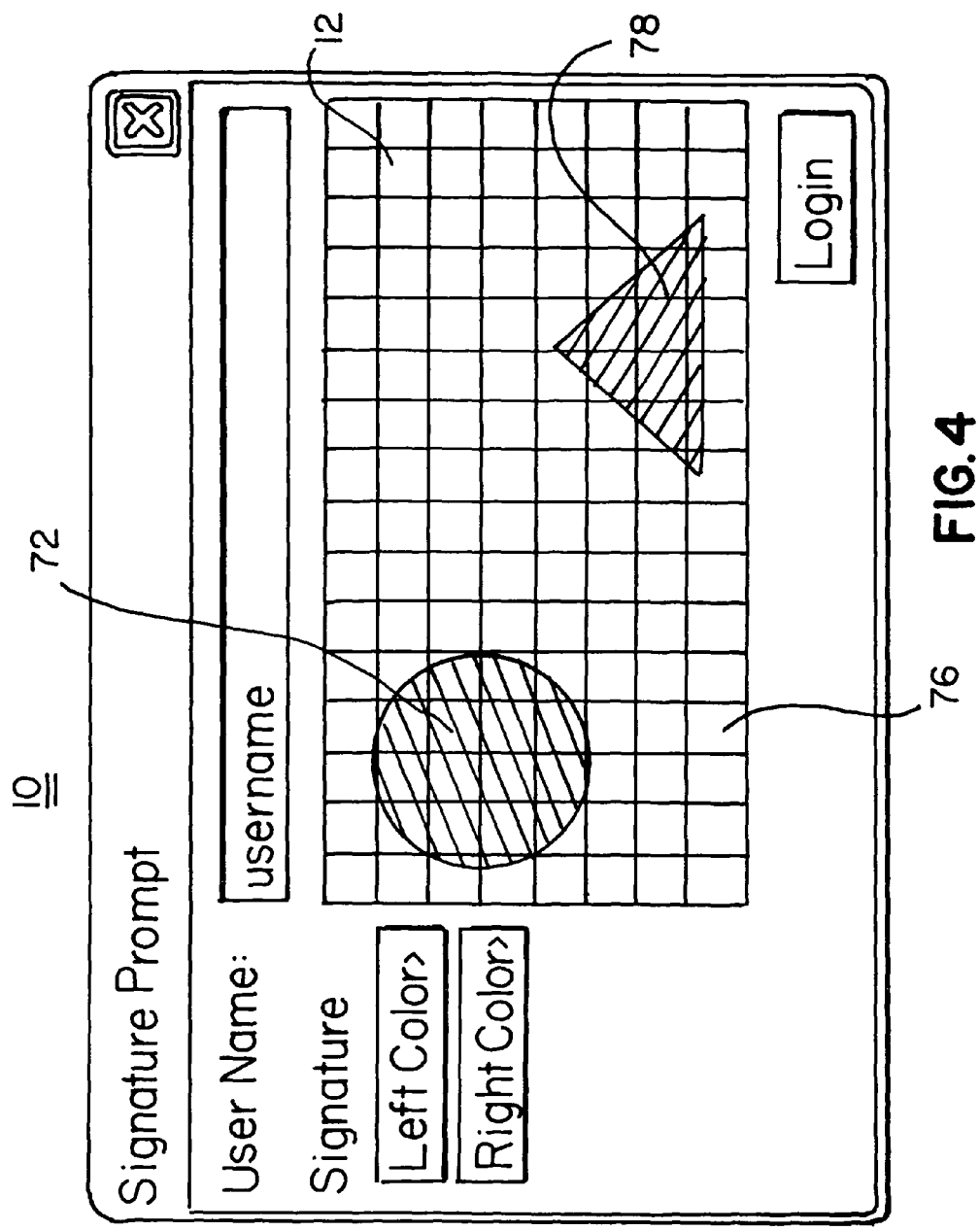
FIG. 4 is a view, similar to that of FIG. 3, however showing different boundary conditions upon the password entry screen.

In an elaboration of such an embodiment only a spatial subset of matrix 12 is functional for purposes of creation of a chromic password in accordance with the invention. This is shown in FIG. 3 wherein arbitrary geometries, for example, circles 72 and 74 are superimposed upon matrix 12 which may also be expanded in N access dimension as is shown by area 76. As may be additionally noted in FIG. 4, a circle 72 and a triangle 78 may be used in lieu of the circles 72 and 74 shown in FIG. 3. Therefrom, it may be appreciated that an essentially infinite number of geometries may serve as boundary conditions to limit the coordinates 70 of matrix 12 that are which valid color entries, this in combination with left, right, color or without left-right color distinction. Such boundary conditions may, in addition, be essentially controlled from, for example, a command headquarters location such that a user will only be informed on a daily or hourly basis of the size, location and character of the boundary conditions within which a novel spatial and chromatic password set forth by the present method may be entered.

Figure 5:
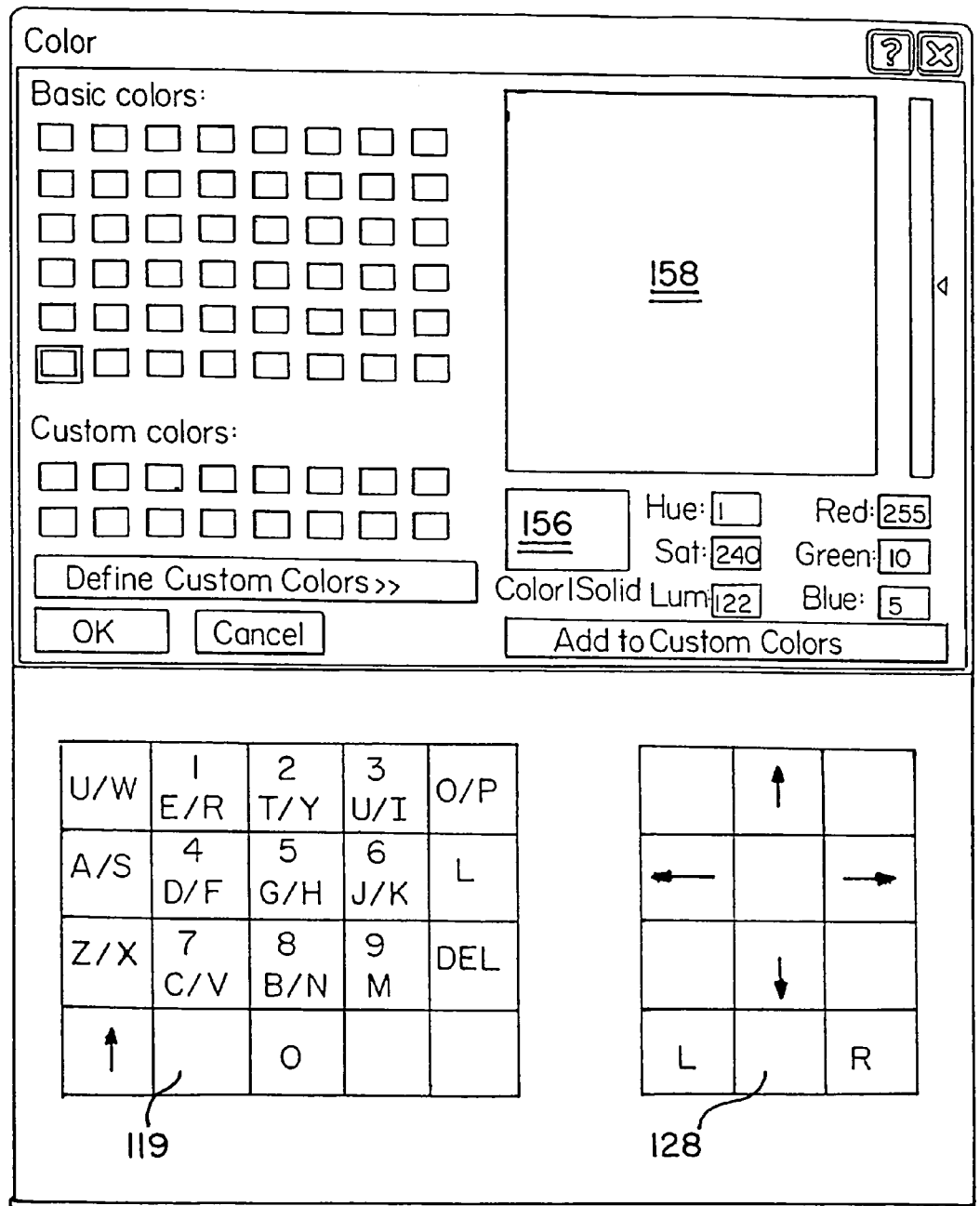
FIG. 5 is a view of a further embodiment of a color selection keypad in which a user name keypad and mouse have been integrated therein.

In FIG. 5 is shown another embodiment 136 of color selection keypad (CSK) which differs from the above-described CSK 36 in its integration of a user name keypad (UNK) 119 and mouse 128 into the CSK. Such integration of the UNK 119 and mouse 128 into the CSK 136 will be of particular utility in applications such as ATMs, bank vaults, and numerous other security applications requiring that a separate keyboard 19 or mouse 28 respectively (of FIG. 1) be eliminated. UNK 119 will of course be of particular value in simplifying entry of user name 18 upon the PES 10 (see FIG. 1), while UNK 119 will be of value in entry of coordinates 70 and use of cursor 57, described above in FIG. 2, and cursor 68, described with reference to FIG. 1. The left and right function of mouse 128 is accomplished through use of the keys marked L and R therein. By the geometry of integrated UNK 119 also provides for easy use of that keypad as, in addition, an input to a telephone which, in certain security situations, is essential.

While there has been shown and described the preferred embodiment of the instant invention it is to be appreciated that the invention may be embodied otherwise than is herein specifically shown and described and that, within said embodiment, certain changes may be made in the form and arrangement of the parts without departing from the underlying ideas or principles of this invention as set forth in the Claims appended herewith.

The invention claimed is:

1. A method of generating a non-linear spatial and chromatic password, the method comprising the steps of:
   (a) establishing a non-linear spatial password entry pattern (SPEP) within boundary conditions within a matrix of a password entry screen (PES), said SPEP including a plurality of coordinates of said matrix of said PES;
   (b) selecting a first color from a color selection keypad (CSK) having a multiplicity of selectable colors thereon;
   (c) mapping said first color to a first coordinate of said SPEP of said matrix;
   (d) selecting a second color from said CSK, in which each of said selecting steps of each of said colors of said CSK comprises selecting a color consisting of a ratio of primary colors of red, green and blue;
   (e) defining one or more of said primary colors by selection of a numeric parameter corresponding to a level of intensity of said primary color;
   (f) mapping said second color to a second coordinate of said SPEP of said matrix; and
   (g) repeating and selecting and mapping steps using colors of said CSK for respective n number of coordinates of said SPEP until an entirety of coordinates defining said non-linear SPEP are filled with colors mapped from said CSK.

2. The method as recited in 1, further comprising the step of:
   further defining one or more of said selected colors by numerically adjusting a level of chromatic hue, saturation and/or luminosity.

3. The method as recited in 1, further comprising the step of:
   using a left mouse click to color map a first subset of said SPEP and a right mouse click to color map a second subset of said SPEP, in which said subsets define an entirety of said SPEP.

4. The method as recited in claim 3, further comprising the step of:
   using said coordinates of said matrix to define said first subset as a linear sequence of coordinates.

5. The method as recited in claim 4, comprising the step of:
   arranging said first subset as a linear sequence of matrix coordinates, said sequence parallel to that of said first subset.

6. The method as recited in claim 3, further comprising the step of:
   using said coordinates of said matrix to define said second subset of a linear sequence of said matrix coordinates.

7. The method as recited in claim 3, further comprising the step of:
   selecting a sequence of right mouse click coordinate entries for said first subset relative to a sequence of left mouse clicks for said second subset.

8. The method as recited in claim 3, in which a mouse, capable of said left and right mouse clicks, comprise a portion of said CSK.

9. The method as recited in claim 8, further comprising the step of:
   selecting a sequence of right mouse click coordinate entries for said first subset relative to a sequence of left mouse clicks for said second subset.

10. The method as recited in claim 8, in which in which each of 1 to n of said mapping steps for each respective coordinate of said SPEP comprises a predetermined left or right mouse click for accomplishment of mapping thereof to a corresponding coordinate of said SPEP.

11. The method as recited in claim 1, further comprising the step of: providing a main password screen including both said PES and a subscreen for entry of a user name.

12. The method as recited in claim 1, further comprising the step of:
    selecting one of between 0 and about 255 parts of each of said red, green and blue primary colors to thus define a said ratio and color for purposes of mapping to a coordinate of said SPEP.

13. The method as recited in claim 1, further comprising the step of:
    deleting a color mapped to a coordinate of said SPEP within a selected time period following its entry onto said coordinate.

14. The method as recited in claim 1, further comprising the step of:
    changing to a default color a color which has been mapped onto a coordinate of said SPEP after a selected time period.

15. The method as recited in claim 1, in which at least one of said color selection steps comprises the step of:
    selecting a color having a customized effect not definable in terms of primary color, hue, saturation or luminosity.

16. The method as recited in claim 1, in which each of 1 to n of said mapping steps for each respective coordinate of said SPEP comprises a predetermined left or right mouse click for accomplishment of mapping thereof to a corresponding coordinate of said SPEP.

17. The method as recited in claim 1, in which any of said colors I through n may be the same as any other color selected.

* * * * *